J. W. WYTON.
EXPANSION PIPE JOINT.
APPLICATION FILED JULY 6, 1910.
1,013,258.
Patented Jan. 2, 1912.
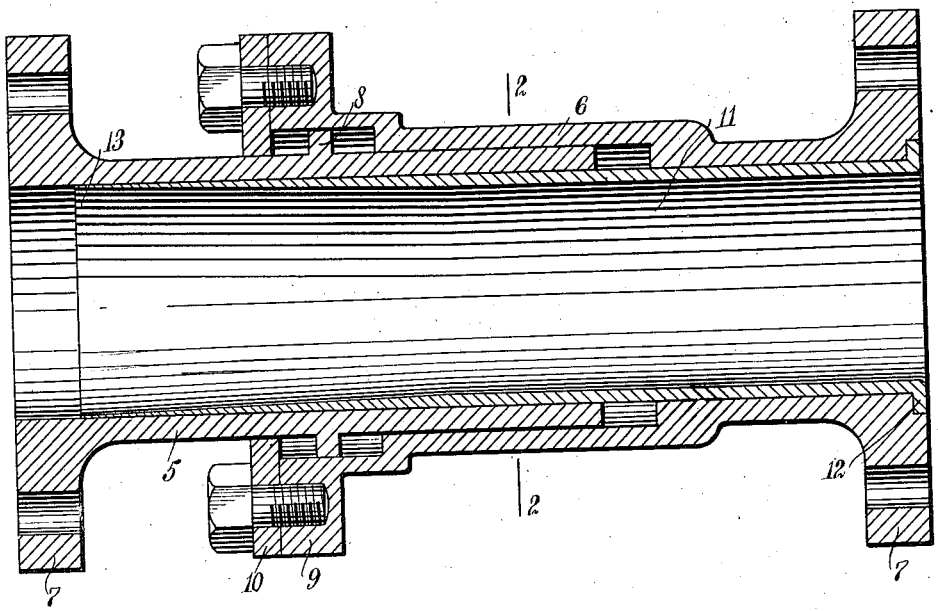
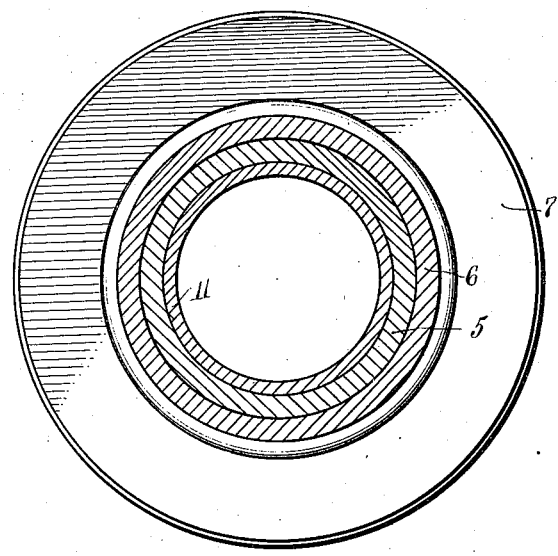
WITNESSES:
INVENTOR
James W. Wyton
BY
ATTORNEYS

UNITED STATES PATENT OFFICE.

JAMES W. WYTON, OF NEW YORK, N. Y.

EXPANSION PIPE-JOINT.

1,013,258.  Specification of Letters Patent.  Patented Jan. 2, 1912.

Application filed July 6, 1910. Serial No. 570,545.

*To all whom it may concern:*

Be it known that I, JAMES W. WYTON, a subject of the King of Great Britain, and a resident of the city of New York, borough of Brooklyn, in the county of Kings and State of New York, have invented a new and Improved Expansion Pipe-Joint, of which the following is a full, clear, and exact description.
The invention is an improvement in expansion joints, and is primarily designed for use in the length of steam pipe running from the boiler to the engine of steamships, although it is adapted for steam and other heated fluid pressure pipes generally.

The invention has in view a joint which will compensate for the lengthening and shortening of the pipe due to the expansion and contraction, without leak and without the use of the customary packings.

Reference is to be had to the accompanying drawings forming a part of this specification, in which similar characters of reference indicate corresponding parts in both views.

Figure 1 is a longitudinal central section of an expansion pipe joint constructed in accordance with my invention; and Fig. 2 is a cross-section of the same on the line 2—2 of Fig. 1.

The expansion pipe joint embodies in its construction two telescoping joint sections 5 and 6 respectively, each joint section shown to have an external flange 7 for connecting the joint with the steam or other fluid pressure pipe. The joint section 6 is counterbored to slidably receive the telescoping portion of the joint section 5, and is further enlarged at its inner end to receive a guide flange 8 arranged externally of the joint section 5. The inner end of the joint section 6 is also shown to be provided with an external flange 9, to the outer face of which is bolted a combined guide and stop ring 10, the inner edge of the ring affording a bearing for the joint section 5, and limiting the separation of the two joint sections, the sliding movement of the joint sections being confined to the length of the counterbored end of the joint section 6, minus the thickness of the guide flange 8.

Snugly fitting within the joint sections 5 and 6, is a tubular closure or sealing member 11, made of copper or brass, or some metal having a relatively higher co-efficient of expansion than the co-efficient of expansion of the joint sections. The sealing member is preferably held in place, bridging the space or joint between the portions of the joint sections of the same diameter; by providing the member with an external flange 12 at one end, fitting within an annular recess formed in the outer face of the flange 7 of one of the joint-sections, shown to be the section 6. The sealing member internally tapers from a point near the center to its unflanged end, which is shown to be provided with a very thin or feather edge 13, whereby this portion of the sealing member is very sensitive to the temperature of the pipe, and is easily expanded by the steam or other heated fluid pressure.

When the joint is applied to the steam or other fluid pressure pipe, the flange of the latter, which bears against and is bolted to the flange 7 having the interfitting flange 12 of the sealing member, bears against the flange 12 and effectually prevents the dislocation of the sealing member when the joint sections move within each other, under the expansion and contraction of the pipe. The bearings between the two joint sections afforded by the inner telescoping portions and by the guide flange 8 and ring or flange 10, act to effectively keep the joint sections in alinement, whereby there is no opportunity for one of the said sections binding within the other. When the steam or other heated fluid pressure passes through the joint, the sealing member is expanded within the pipe sections to a relatively greater extent than the expansion of the sections themselves, forming a fluid-tight joint in any position of the said sections within their limits of adjustment, the thin or feather edge of the sealing member being pressed to the joint section within which it is placed, not only by reason of the expansion of the member, but to a relatively greater extent than the thicker portion of the sealing member, by the steam or fluid pressure.

Having thus described my invention, I claim as new and desire to secure by Letters Patent:

In an expansion pipe joint, a joint section having a double counterbore extending from its inner end, a second joint section slidably fitting within the inner counterbored portion of the first and having an external guide flange bearing within the outer counterbored portion of the first joint section, a guide ring secured to the inner end of the first joint section and bearing on the second joint section, and a tubular sealing member fitting within the two sections of the joint.

In testimony whereof I have signed my name to this specification in the presence of two subscribing witnesses.

JAMES W. WYTON.

Witnesses:
 LOUIS NEWLYN STICKLAND,
 WILLIAM WHITE.